United States Patent
Sevcik et al.

(10) Patent No.: US 6,330,542 B1
(45) Date of Patent: Dec. 11, 2001

(54) AUTOMATED INTERNET QUOTING AND PROCUREMENT SYSTEM AND PROCESS FOR COMMERCIAL PRINTING

(75) Inventors: Jan Joseph Sevcik, Foster City; Katharine Woods Handler; Jon Johansen, both of San Francisco, all of CA (US)

(73) Assignee: Ecorporate Printers, Inc., Foster City, CA (US)

( * ) Notice: Subject to any disclaimer, the term of this patent is extended or adjusted under 35 U.S.C. 154(b) by 0 days.

(21) Appl. No.: 09/449,158

(22) Filed: Nov. 24, 1999

(51) Int. Cl.[7] .................................................. G06F 17/60
(52) U.S. Cl. .............................................. 705/8; 705/400
(58) Field of Search ..................................... 700/100, 101, 700/102; 705/8, 400

(56) References Cited

U.S. PATENT DOCUMENTS

| | | | |
|---|---|---|---|
| 4,495,582 | 1/1985 | Dessert et al. ......................... 364/469 |
| 4,839,829 | 6/1989 | Freedman ............................... 345/329 |
| 5,132,915 | 7/1992 | Goodman ................................ 364/479 |
| 5,241,464 | 8/1993 | Greulich et al. ....................... 364/401 |
| 5,249,120 | * 9/1993 | Foley ......................................... 705/1 |
| 5,255,207 | * 10/1993 | Cornwell ................................... 703/1 |
| 5,280,425 | * 1/1994 | Hogge ..................................... 712/300 |
| 5,287,194 | 2/1994 | Lobiondo ................................. 358/296 |
| 5,383,129 | * 1/1995 | Farrell ....................................... 705/400 |
| 5,550,746 | 8/1996 | Jacobs ................................. 364/479.01 |
| 5,726,898 | 3/1998 | Jacobs ................................. 364/479.01 |
| 5,768,142 | 6/1998 | Jacobs ................................. 364/479.01 |
| 5,826,244 | 10/1998 | Huberman ............................... 705/37 |
| 5,897,260 | 4/1999 | Zingher ................................... 101/494 |
| 5,930,810 | 7/1999 | Farros et al. ........................... 707/506 |
| 5,960,164 | 9/1999 | Dorfman et al. ....................... 395/110 |
| 6,012,066 | 1/2000 | Discount et al. ....................... 707/103 |
| 6,012,890 | 1/2000 | Garrido ................................... 412/19 |
| 6,018,338 | 1/2000 | Greulich et al. ....................... 345/333 |
| 6,064,838 | * 5/2000 | Maruta et al. ........................... 399/79 |

FOREIGN PATENT DOCUMENTS 09-305665-A * 11/1997 (JP).
WO-00/20983-A1 * 4/2000 (WO).

OTHER PUBLICATIONS

Antoniak: "Software Eliminates Guesswork When Estimating Cost", Printing, Jul. 31, 2000, v145, n5, p. 11.*

* cited by examiner

Primary Examiner—Edward R. Cosimano
(74) Attorney, Agent, or Firm—Pennie & Edmonds LLP

(57) ABSTRACT

Automated internet or other networked data processing system commercial printing software consists primarily of two components:

A Print Buyer Component (22) and
A Print Provider Component (24). The print buyer component (22) and the print provider component (24) are coupled together by an automated quoting and procurement system (26). The print buyer component (22) accesses the automated quoting and procurement system (26) through a series of modules (28) representing print product categories. The print provider component (24) accesses the automated quoting and procurement system through a series of modules (30) representing vendor functions to be furnished to a print buyer.

23 Claims, 19 Drawing Sheets

---HEADER GRAPHICS HERE---
--------ONLINE SERVICE CATALOG---------
\*\* CUSTOMER I.D. \*\*          CATALOG [\*LOG OUT\*]
--THE ONLINE CATALOG--
- HOW IT WORKS
  (HOW-TO BLURB)
- WHAT YOU NEED TO DO
  (CLIENT-SIDE REQUIREMENTS BLURB)
- [ETC]
SELECT A JOB TYPE
MARKETING COLLATERAL
POSTCARDS
ENVELOPES
LETTERHEAD
BOOKLETS, NEWSLETTERS, AND CATALOGS
PRESENTATION FOLDERS
40
---FOOTER GRAPHICS AND NAVIGATION HERE---
FIG.2

---HEADER GRAPHICS HERE---

--------BEGIN NEW JOB----------

\*\* CUSTOMER I.D. \*\*            CATALOG [\*LOG OUT\*]

- WHAT IS NEW
  (NEWS ANNOUNCEMENT BLURB)
- HOW YOU CAN SAVE
  (DISCOUNTS, SPECIAL OFFERS BLURB)
- PERSONALIZED ANNOUNCEMENTS
  (INDIVIDUAL-SPECIFIC INFO BLURB)

SELECT A JOB TYPE

MARKETING COLLATERAL

POSTCARDS

ENVELOPES

LETTERHEAD

BOOKLETS, NEWSLETTERS, AND CATALOGS

PRESENTATION FOLDERS

42

CURRENT JOB STATUS            ACCOUNT HISTORY

---FOOTER GRAPHICS AND NAVIGATION HERE---

FIG.3

---HEADER GRAPHICS HERE---

--------BEGIN NEW JOB---------

CUSTOMER I.D.        CATALOG [*LOG OUT*]

---JOB ESTIMATE---
- JOB TYPE------:POSTCARDS
- VOLUME-------:
- TURNAROUND---:
- PRESS CHECK--:
- SHIPPING-----:
- PRICE-------- :{$0.00}

- SIZE---------:6x9
- PANEL--------:3 PANEL
- BINDING------:BUS. MAILER
- INK FRONT----:4-COLOR+1 PMS
- INK BACK-----:BLACK
- COATING------:NO COAT
- PAPER FINISH--:GLOSS
- PAPER WEIGHT--:10 pt.
- PAPER COLOR--:WHITE
- PAPER GRADE--: #1

CHANGE OPTIONS

--SELECT JOB OPTIONS--
JOB TYPE: POSTCARDS
- QUANTITY---:
  [CHOOSE QUANTITY-  ▽]

- TURNAROUND-:
  [ENTER DATE]

- PRESS CHECK-:
  [NO PRESS CHECK  ▽]

- DELIVERY ZIP:
  [ZIP CODE]

- SHIPPING----:
  [CHOOSE SHIPPING-  ▽]

- GET HELP
  [UPDATE ESTIMATE]
  ～50

CURRENT JOB STATUS       44      ACCOUNT HISTORY

---FOOTER GRAPHICS AND NAVIGATION HERE---

FIG.4

---HEADER GRAPHICS HERE---

--------BEGIN NEW JOB---------

CUSTOMER I.D.   CATALOG [*LOG OUT*]

---JOB ESTIMATE---
- JOB TYPE------:POSTCARDS
- VOLUME-------:2500
- TURNAROUND---:03/12/2000
- PRESS CHECK--:NO PRESS CHECK
- SHIPPING------:2nd DAY AIR
- PRICE--------:{$327.76}

- SIZE---------:6x9
- PANEL--------:3 PANEL
- BINDING------:BUS. MAILER
- INK FRONT----:4-COLOR+1 PMS
- INK BACK-----:BLACK
- COATING------:NO COAT
- PAPER FINISH--:GLOSS
- PAPER WEIGHT--:10 pt.
- PAPER COLOR--:WHITE
- PAPER GRADE--: #1

CHANGE OPTIONS

[ BEGIN JOB ]

CURRENT JOB STATUS

--SELECT JOB OPTIONS--
JOB TYPE: POSTCARDS

- QUANTITY---:
  [CHOOSE QUANTITY-  ▽]

- TURNAROUND-:
  [ENTER DATE]

- PRESS CHECK-:
  [NO PRESS CHECK  ▽]

- DELIVERY ZIP:
  [ZIP CODE]

- SHIPPING----:
  [CHOOSE SHIPPING-  ▽]

- GET HELP

[ UPDATE ESTIMATE ]
~50

44

ACCOUNT HISTORY

---FOOTER GRAPHICS AND NAVIGATION HERE---

FIG.5

---HEADER GRAPHICS HERE---

--------POSTCARD CONFIGURATION----------

CUSTOMER I.D. 　　　　　　　　　　　CATALOG [*LOG OUT*]

SIZE OPTIONS

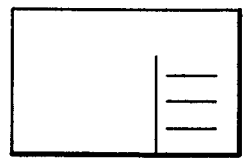　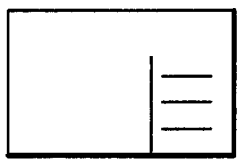　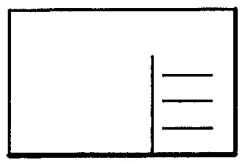

( SIZE )　( PANEL )　( BINDING )　( COATING )

( INK FRONT )　( INK BACK )　( PAPER FINISH )　( PAPER GRADE )　( PAPER WEIGHT )

GET HELP ON THESE OPTIONS

SIZE OPTIONS
[3x5 ▽]

PANEL OPTIONS
[SINGLE ▽]

BINDING OPTIONS
[BUSINESS REPLY MAILER ▽]

INK COLOR OPTIONS
FRONT: [BLACK ▽]
BACK: [BLACK ▽]

COATING OPTIONS:
[NONE ▽]

PAPER OPTIONS:
FINISH: [GLOSS ▽]
WEIGHT: [65 # COVER ▽]
COLOR: [WHITE ▽]
GRADE: [#1 ▽]

[ GET ESTIMATE ]　46

---FOOTER GRAPHICS AND NAVIGATION HERE---

FIG.6

---HEADER GRAPHICS HERE---

--------CONFIRM JOB START---------

\*\* CUSTOMER I.D. \*\*          CATALOG [\*LOG OUT\*]

--SELECT JOB OPTIONS--
JOB TYPE: POSTCARDS

- QUANTITY---:
  [CHOOSE QUANTITY-  ▽]
- TURNAROUND-:
  [ENTER DATE]
- PRESS CHECK-:
  [NO PRESS CHECK  ▽]
- DELIVERY ZIP:
  [ZIP CODE]
- SHIPPING----:
  [CHOOSE SHIPPING-  ▽]
- GET HELP

[UPDATE ESTIMATE]
~50

--CONFIRM JOB---
\*\* JOB ID # \*\*

- JOB TYPE------:POSTCARDS
- VOLUME-------:2500
- TURNAROUND---:03/12/2000
- PRESS CHECK--:NO PRESS CHECK
- SHIPPING-----:2nd DAY AIR
- SHIPPED TO:
  - JOE CUSTOMER
  - 123 MAIN STREET
  - ANYTOWN, CA 94111
  - USA
- BILLED TO:
  - NIFTYCO, INC.
  - 1 BIG STREET
  - ANYTOWN, CA 94111
  - USA

- PRICE--------: \*\* $327.76 \*\*

- SIZE---------:6x9
- PANEL--------:3 PANEL
- BINDING------:BUS. MAILER
- INK FRONT----:4-COLOR+1 PMS
- INK BACK-----:BLACK
- COATING------:NO COAT
- PAPER FINISH--:GLOSS
- PAPER WEIGHT--:10 pt.
- PAPER COLOR--:WHITE
- PAPER GRADE--: #1

ARE YOU SURE YOU WISH TO BEGIN THIS JOB?

[YES, I'M SURE]

CURRENT JOB STATUS          ACCOUNT HISTORY

---FOOTER GRAPHICS AND NAVIGATION HERE---

FIG.7

---HEADER GRAPHICS HERE---

--------CONFIRM JOB START---------

CUSTOMER I.D.           CATALOG [*LOG OUT*]

-- JOB STARTED --

JOB ID # 
- JOB TYPE------:POSTCARDS
- VOLUME------:2500
- TURNAROUND---:03/12/2000
- SHIPPING----- :2nd DAY AIR
- SHIPPED TO:
  - JOE CUSTOMER
  - 123 MAIN STREET
  - ANYTOWN, CA 94111
  - USA
- BILLED TO:
  - NIFTYCO, INC.
  - 1 BIG STREET
  - ANYTOWN, CA 94111
  - USA
- PRICE----:  $327.76

BEGIN A
NEW JOB

VIEW YOUR
CURRENT JOB STATUS

VIEW YOUR
ACCOUNT HISTORY

ACCOUNT MANAGEMENT

---FOOTER GRAPHICS AND NAVIGATION HERE---

FIG.8

---NICE HEADER GRAPHICS HERE---

--------JOB STATUS UPDATE---------

CUSTOMER I.D.           CATALOG [*LOG OUT*]

RETURN

| ART RECEIVED | CLIENT APPROVAL | PRE-PRESS | PRESS RUN | FOLDING/PACKAGING |
|---|---|---|---|---|
| JOB ID # | COMPLETED ▽ [1] | COMPLETED ▽ [1] | PENDING ▽ [D] | PENDING ▽ [D] |

[ SUBMIT QUERY ]

| ART RECEIVED | CLIENT APPROVAL | PRE-PRESS | PRESS RUN | FOLDING/PACKAGING |
|---|---|---|---|---|
| JOB ID # | COMPLETED ▽ [1] | COMPLETED ▽ [1] | PENDING ▽ [D] | PENDING ▽ [D] |

[ SUBMIT QUERY ]

| ART RECEIVED | CLIENT APPROVAL | PRE-PRESS | PRESS RUN | FOLDING/PACKAGING |
|---|---|---|---|---|
| JOB ID # | COMPLETED ▽ [1] | COMPLETED ▽ [1] | PENDING ▽ [D] | PENDING ▽ [D] |

[ SUBMIT QUERY ]

| ART RECEIVED | CLIENT APPROVAL | PRE-PRESS | PRESS RUN | FOLDING/PACKAGING |
|---|---|---|---|---|
| JOB ID # | COMPLETED ▽ [1] | COMPLETED ▽ [1] | PENDING ▽ [D] | PENDING ▽ [D] |

[ SUBMIT QUERY ]

| ART RECEIVED | CLIENT APPROVAL | PRE-PRESS | PRESS RUN | FOLDING/PACKAGING |
|---|---|---|---|---|
| JOB ID # | COMPLETED ▽ [1] | COMPLETED ▽ [1] | PENDING ▽ [D] | PENDING ▽ [D] |

[ SUBMIT QUERY ]

FIG.16

---VENDOR PRICING GRID--- ---HEADER GRAPHICS HERE---
 CUSTOMER I.D. 
RETURN    CATALOG [*LOG OUT*]

| 170 | 172 | 174 | 176 | 178 | 180 | 182 | 184 | 186 | 188 | 190 |
|---|---|---|---|---|---|---|---|---|---|---|
|  | IMPRESSIONS PER HOUR | HOURLY PRESS RATE | MAKE-READY TIME | MAKE-READY HOURLY RATE | PRESS CHECK COST | TURNAROUND TIME-DAYS | NUMBER OF COLORS | SHEET SIZE | WASTE PERCENTAGE | MAKE-READY WASTE # OF SHEETS |
| PRESS TYPE A |  | $ | HOURS | $ | $ | DAYS |  |  | % |  |
| PRESS TYPE B |  | $ | HOURS | $ | $ | DAYS |  |  | % |  |
| PRESS TYPE C |  | $ | HOURS | $ | $ | DAYS |  |  | % |  |
| PRESS TYPE D |  | $ | HOURS | $ | $ | DAYS |  |  | % |  |
| PRESS TYPE E |  | $ | HOURS | $ | $ | DAYS |  |  | % |  |
| PRESS TYPE F |  | $ | HOURS | $ | $ | DAYS |  |  | % |  |
| PRESS TYPE G |  |  |  |  |  |  |  |  | % |  |

FIG.17

AUTOMATED INTERNET QUOTING AND PROCUREMENT SYSTEM AND PROCESS FOR COMMERCIAL PRINTING

TECHNICAL FIELD

This invention relates to an improved form of e-commerce that is implemented on the Internet or other system of networked computers. More particularly, the invention relates to a system and process for managing the quoting and procurement of commercial printing. The system addresses inefficiencies that exist in both of these processes for both the buyers of commercial printing and the providers of commercial printing. Specifically, the system and process provides a graphical interface between buyers of commercial printing and the providers. The system allows buyers of printing to receive immediate quotes by selecting simple graphic representations of the product they wish to purchase and selecting any variable information for that product. This procedure saves the buyer significant time and also saves the printing providers significant time in having to prepare the quote.

BACKGROUND

The usual method in the industry for printing buyers is to contact several inside or outside sales representatives of printing companies to obtain quotes for projects. However, this is very time consuming and does not necessarily result in the best pricing for the buyer. Furthermore, this is very time consuming for the printing provider because quotes have to be prepared for every project. The other solution is for the buyer to use some of the other Internet sites that have been established for obtaining printing quotes.

One Internet site that provides quoting functions is PrintBuyer.com. However, this application does not provide the same solution as the invention. More specifically, this Internet application does not provide an immediate quote. The buyer first must provide the specifications by completing several lengthy forms and then this information is sent via email to the printing providers that subscribe to the service. The printing providers then prepare the quote manually and send the quote to the print buyer via email or fax. These Internet sites do not allow the buyer to simply choose a graphic of an item for which to receive a quote. Thus, the benefits to the buyer are questionable. Furthermore, this Internet site does not make any attempt to match the requested product to the best printing provider for that product. The result is that the printing providers submitting quotes for that project may not be the most competitive companies for that project.

Another Internet site, PrintAccess, allows printing buyers to find printing providers using a three step method. The first step allows the printing buyer to select among several general categories, which include printing providers, prepress firms, designers, and other categories. The next step provides a subcategory of the chosen category. The final step allows the user to select a company within the subcategory by geographic location. However, the solution does not provide any quoting functions of any type.

Another Internet application, PrintBid.com, is simply a nationwide database of printing companies that allows the printing buyer to find a company based on geographic location, equipment, and specialties and learn additional information about that company, including annual revenue, client profile, years in business, and number of employees. However, this application does not provide any quoting functions.

Another Internet application in the printing industry is offered by iPrint. iPrint primarily addresses the procurement of business cards, letterheads, certain advertising specialties, and labels. This Internet application does not, however, provide any quoting functions for regular commercial printing. This Internet site allows printing buyers to purchase the products mentioned above but not any additional products.

Another Internet application recently introduced is called Noosh Inc. Noosh provides an Internet application that enhances the communication between print buyers and print providers. It also helps both print buyers and print providers manage the printing process more easily. However, it does not provide immediate quotes or use the type of graphic interfaces used by the present invention. A similar application is provided by Impresse, but as with the Noosh application, immediate quotes are not provided.

Another Internet application currently available is an application called Collabria. Collabria is a subscription based software package available to print providers. This application is an Internet based printing workflow solution that automates the process of buying, managing, and producing reprinted or templated print applications. A difference between that application and this invention is that the Collabria application does not provide any quoting functions.

An auction based approach for providing printing and other document services is described in U.S. Pat. No. 5,826,244, issued Oct. 20, 1998 to Huberman. While the system disclosed there utilizes a computer network to speed communication between a customer and a plurality of potential suppliers, it still relies on a conventional bidding process by the potential suppliers in response to a description of a printing job provided by the customer.

So while there are other applications that attempt to provide solutions to printing buyers by providing a more efficient quoting and purchasing mechanism, there remains a need to provide a more efficient system that not only addresses the needs of printing buyers, but also the needs of the printing provider.

SUMMARY OF THE INVENTION

An objective of the invention is to provide a system and process for managing the quoting and procurement of commercial printing that provides the printing buyer with an immediate quote and that relieves the printing provider of preparing each quotation, thereby significantly reducing estimating costs incurred in the transaction for both the printing buyer and the printing provider.

It is another objective of the invention to provide the buyer with quotations that have been generated from multiple print providers based on criteria which the print buyer can easily change to determine the impact of those changes on the cost of the project.

It is a further objective of the invention to introduce multiple turnaround time options to print buyers. Shorter turnaround times generally equate to higher prices.

It is another objective of the invention to provide such quotations to the printing buyer with a minimal effort required by the printing buyer by using graphical interfaces that correspond with the products for which the printing buyer desires a quotation instead of more traditional methods.

It is another objective of the invention to provide an auto intelligence type function that will give the buyer all of the available options to produce a particular project at a given price which might include changing the paper selections, slightly altering the size of the project, or changing or omitting certain finishes to allow the buyer to make the most informed buying decision.

It is yet another objective of the invention to introduce cost savings into the printing marketplace by aggregating the demand for like products and sending those projects to printing providers that are the most economically efficient producers of those products based on equipment configurations and other economic considerations. Furthermore, it is the intent of the invention to generate these cost savings by increasing efficiency, not by lower profit margins for printing providers. Aggregating the volume of printed products results in greater operating efficiencies for printing providers, thereby allowing the printing providers to lower pricing without making any sacrifices in profit margins.

It is a further objective of the system and process to provide a more standardized approach to what has for many years been an industry in which each item was considered custom.

These and related objectives are achieved through the use of the automated Internet quoting and procurement system herein disclosed. The automated Internet quoting and procurement system described herein features a series of graphical interfaces which represent various printed products that are linked to a database of prices and other variable options from various print providers. The products are arranged in a catalog by common product type. The printing buyer is guided to the section containing the products for which the buyer needs a quote. The buyer selects the product for which it desires a quote and then is prompted for the additional variable specifications required to compute the quote. This preferably includes variables such as quantity, paper, ink, turnaround time, shipping zip code, and a question which prompts the buyer to determine if a press check is required and if so what is the maximum distance the buyer is willing to travel. Upon selecting the desired variables, the system uses the appropriate algorithm to generate the quote, which also includes the freight costs to the destination zip code.

If the printing buyer does not see a graphic that represents the product for which they are seeking a quote, the buyer is directed to the custom product graphic for that product category. The custom product category allows the printing buyer many more variable options than the standard product graphics and allows the printing buyer to create virtually any variation of the product in that category and still receive an immediate quote. To assist the printing buyer with answering the series of questions required to compute a custom quote, the system features graphical interfaces with each question which help the buyer with the responses to each question. The system has a complex database of information for each of these custom product categories which allow it to search for the criteria entered by the printing buyer. The system computes the optimal equipment on which to print the project given the quality, quantity, and size requested by the buyer, then searches the database for costs for all of the required functions provided by print providers, and then computes the quote using one of many various algorithms depending on the other specifications that were entered by the printing buyer. This novel approach allows the system to automatically generate quotes for custom products, but furthermore, it ensures the project is produced on the most efficient equipment for that particular product.

In another aspect of the invention, printing providers have access to an interface, which allows the provider to input price information, turnaround time, and paper information for each of the products that the provider produces. The print provider also has access to another interface, which provides the status of each pending project.

An additional aspect of the invention features a personal home page for each registered print buyer which features job status information for all projects in process. This information allows the print buyer who is handling multiple projects to check the status of pending projects whenever they desire to do so. The job status information is updated by the print provider's entries.

The attainment of the foregoing and related objects, features and advantages of the invention should be more readily apparent after review of the following more detailed description of the invention, taken together with the drawings, in which:

BRIEF DESCRIPTION OF THE DRAWINGS

FIG. 2 is a Catalog Interface screen used in the system and process of FIGS. 1–1A, which shows the scope of product categories offered to the printing buyer.

FIG. 3 is the Catalog Interface: Product Category screen used in the system and process of FIGS. 1–1A, from which the printing buyer selects the product type.

FIG. 4 is the Catalog Interface: Product Category screen from which the Print Buyer enters the standard variable information pertaining a product selected in FIG. 3.

FIG. 5 is the Catalog Interface: Product Category: Obtain Quote for Standard Product screen, in which a quotation is provided for the product specified in FIG. 4.

FIGS. 6–8 are Catalog Interface: Product Category confirm a job screens used in connection with the quotation provided in FIG. 5.

FIG. 16 is a Print Provider Home Page: Update Job Status Interface screen for all ordered products using the system and process of FIGS. 1–1A.

FIG. 17 is a Vendor Pricing Grid for Custom Quote Products

DESCRIPTION OF SPECIFIC EMBODIMENTS

Figure 1:
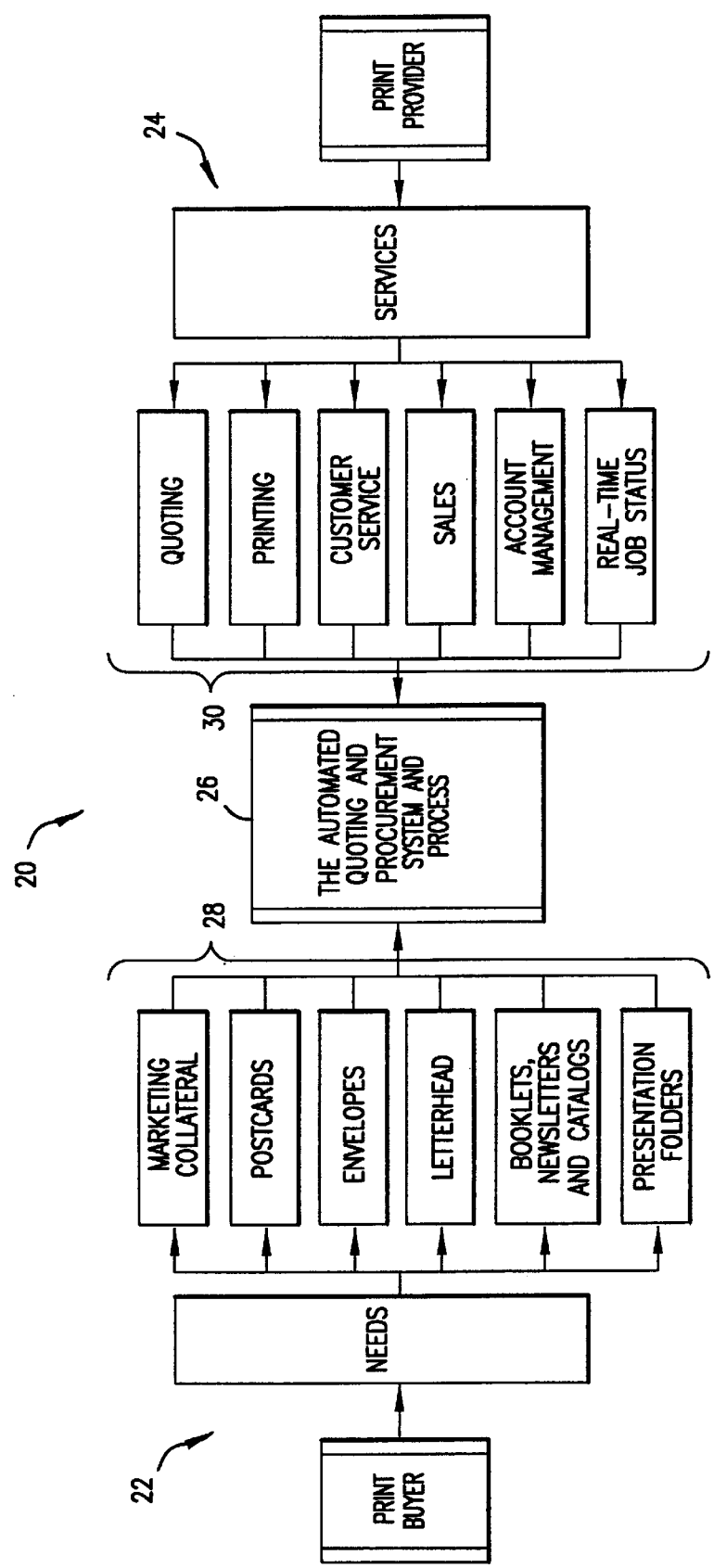
FIG. 1 is a generalized block and flow diagram of an automated quoting and procurement system and process in accordance with the invention.
Figure 1A:
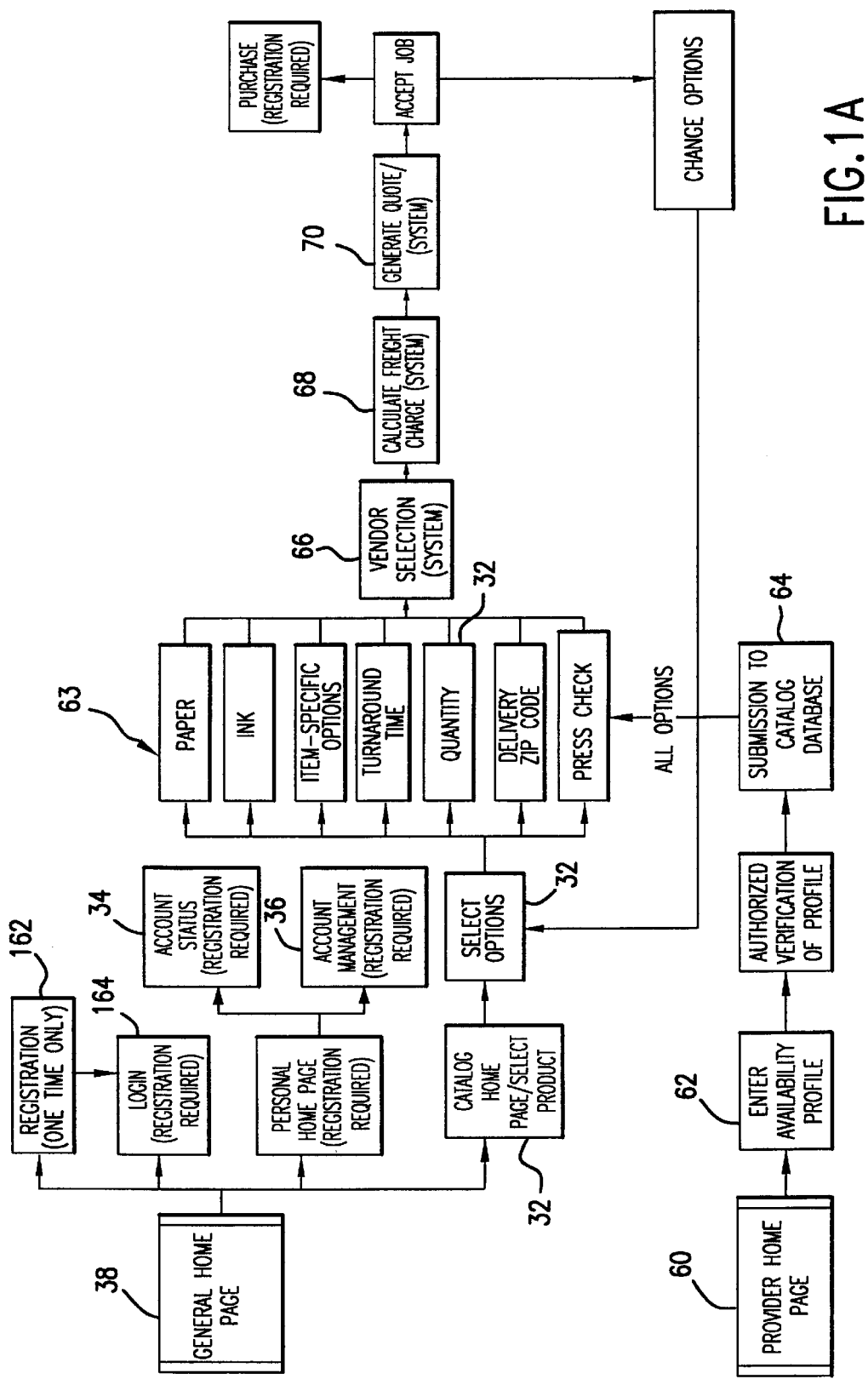
FIG. 1A is a more detailed block and flow diagram of the automated quoting and procurement system shown in FIG. 1.

As shown in FIGS. 1 and 1A, the Automated Internet Quoting and Procurement system and process 20 consists primarily of two components:

The Print Buyer Component 22

The Print Provider Component 24.

The print buyer component 22 and the print provider component 24 are coupled together by an automated quoting and procurement system 26. The print buyer component 22 accesses the automated quoting and procurement system 26 through a series of modules 28 representing print product categories. The print provider component 24 accesses the automated quoting and procurement system through a series of modules 30 representing vendor functions to be furnished to a print buyer.

The Print Buyer Component 22

The print buyer component 22, as shown in FIG. 1A, consists of series of interfaces 32, 34 and 36 to access the quoting, job status, and account management functions of the system and process through a system 30 home page 38. The quoting function 32 provides the printing buyer with an immediate quote for printing products, while the job status and account management functions 34 and 36 allow the print buyer to manage the procurement process more easily.

To understand the significance of receiving an immediate quote that has been computed from various print providers, consider the process typically involved for a corporate print buyer to purchase 50,000 sales sheets. This process can take several days and require many hours to complete. The transaction costs to the print buyer's organization are significant.

- The print buyer phones, faxes, or emails the print provider's sales representative.
- The sales representative has to contact the buyer to either obtain or confirm the specifications.
- The sales representative then forwards the specifications to the print provider's estimating department.
- The estimating department prepares the quote and generally, a customer service representative sends the quote to the buyer.
- The sales representative calls the buyer to confirm that the buyer has received the quote.
- In many situations, the buyer will ask to revise the specifications to include a different paper stock or perhaps the size has changed. The entire process must be repeated.
- In order for the print buyer to obtain multiple bids, the buyer must repeat this process several times to obtain several quotes from different print providers.
- Furthermore, the print buyer may not really know if they are getting the best price because the print providers that have been contacted for the project may not be the most competitive on those items for those quantity ranges.

Furthermore, the transaction costs for the print provider are significant as well. Consider the process for the print provider:

- The print provider must pay the sales representative or customer service representative to obtain the information from the print buyer and communicate back and forth with the buyer.
- The printing provider must pay an estimating staff to prepare all of the quotes. Often very similar quotes are prepared several times a month or even a week.
- There is always the chance of a human error in preparing the quote because either there is a miscommunication between the print provider's sales representative and the client or between the print provider's sales representative and the estimating department. The system eliminates this type of potential error.

The automated Internet Quoting and Procurement Management system 26 makes this process much more efficient.

Entering the Graphic Catalog Interface and Finding the Product

The catalog portion of the quoting function 32 is a primary component of the system and process. It uses a series of graphic interfaces, shown in FIGS. 2–8, which allow the print buyer to visually select the type of product for which they want to request a quote. In order to request a quote, the print buyer enters the catalog and selects a product. Any print buyer using the system may enter the catalog, which is typically accessed from the welcome screen, or home page of the application. Once at the catalog main page 40, FIG. 2, the print buyer may find specific products in the catalog via searching, by entering a text string, or browsing, by clicking until they reach the desired catalog product category. The catalog is subdivided into several categories of common printed material including categories such as marketing collateral, postcards, letterheads, envelopes, booklets and catalogs, newsletters, books, presentation folders, and digitally printed products. Upon accessing the product category the buyer desires, the buyer sees all of the products contained within that category.

Selecting the Product and Standard Variable Options in the Product Category Screen At the product category level of the catalog, each product is displayed with a graphic of that item. The graphics that are displayed depend on the category the buyer is in and are unique to each category. In order to obtain a quote, the print buyer clicks onto the graphic representing the product or selects a job type as shown at 42 in FIG. 3. When the print buyer does this, the buyer is prompted for several variable options as pull down menus for that particular product, as shown at 44 in FIGS. 4 and 5 and at 46 in FIG. 6. Different products have different variable options but typically include the following types of variables:

Quantity. Quantity options offered depend on the type of product but range anywhere from several hundred to over 500,000.

Paper Options. Several paper options are available for each product in various weights, grades, and types including coated and uncoated paper.

Number of Ink Color Options. These include 1 PMS color, 2 PMS colors, 3 PMS colors, four-color process, and four color process plus PMS color options. When a print buyer has selected a certain color option, a sample of the color selection appears in the graphic. For example, if the print buyer has selected a one-color piece, then the graphic will appear in one color. If the print buyer has selected a four-color process piece, then the graphic will appear in four-color process.

Coating Options including aqueous and UV coatings.

Turnaround time options. The turnaround time available depends on each project but ranges from a day to six weeks depending on the print buyer's desire to reduce the cost of the project.

Delivery Zip Code. The delivery zip code is used to select the nearest available print provider given the criteria entered by the print buyer and to compute the freight charges.

Press Check Option. A press check allows the print buyer to approve the project when it is on press prior to having the entire project printed. If the print buyer wants a press check, then the system also prompts the buyer for the maximum distance the buyer is willing to travel for the press check.

The following are descriptions of the graphics used in some of the categories:

Marketing Collateral: The marketing collateral category includes graphics of many common types of collateral pieces including sales and data sheets, brochures of various sizes and configurations, and newsletters. The standard variable options are available. In addition to the standard options, other options for perforations and other special bindery options are displayed using graphical interfaces.

Postcards: The postcard category is broken into three different categories. When the print buyer enters the postcard category, the buyer has to choose from a single panel postcard, a double panel, or a triple panel all of which are displayed as graphics indicating the type of postcard represented. Once this selection is made, the print buyer enters the screen and sees the front and back of a postcard. The standard variable options are available and in addition, the buyer chooses the ink colors for the front and back of the postcard separately and also selects the size of the postcard. In addition to the standard options, the buyer is presented with several options for the size and several optional bindery options including perforations for a reply card and Rolodex die cuts options.

Envelopes: The envelope category includes graphics of many types of envelopes including #10 regular, #10 regular window, #10 double window, #9 regular, and representations of booklet and catalog envelopes. The graphics default to display the front of the envelope but an option allows the buyer to see the back as well to ensure the buyer has chosen the desired style. The standard variable options are available. In addition, for the booklet and catalog envelope, the print buyer also selects the desired size from a pull down menu. For all of the envelope graphics, the buyer also has the option of selecting an option for the envelope to be printed as a flat sheet and then converted to an envelope for projects with more precise registration.

Letterheads: The letterhead category includes a graphic of the front of a letterhead and graphic of the back of a letterhead. The standard variable options are available except that the buyer chooses the ink colors for the front and back of the letterhead separately. Since most letterheads are not printed on the back, the graphic representing the back always defaults to no printing on back and the buyer does not have to make any changes unless there is printing on the back. In addition, the print buyer must select the size which includes several standard options, indicate whether or not the letterheads are to be continues sheets or cut sheets, and indicate any perforations on the letterhead such as would be used for statements.

Booklets, Newsletters, and Catalogs: In the booklets and catalogs section, the print buyer is first prompted to select one of two graphics. One graphic represents a booklet, newsletter, or catalog which has the same colors throughout the booklet and one that represents a booklet, newsletter, or catalog that has a different number of colors on the cover versus the inside of the booklet or catalog. If the print buyer selects the graphic representing the same colors throughout, the print buyer must select from the standard variable options and in addition, must select the size options which include 8.5×5.5 and 8.5×11 formats and the number of pages in the project. For projects below a certain number of pages, the system defaults to providing saddle stitching as the only option, but on projects with a higher page count, it offers other available bindery options depending on what is appropriate for the thickness of the project. These options are graphically displayed and allow the print buyer to select the preferred option. If the print buyer selects the graphic representing a booklet, newsletter, or catalog that has a different number of colors on the cover versus the inside pages, then the buyer will see two graphics, one for the cover and one for inside pages. The standard variable options are selected for each graphic, and in addition, the print buyer selects the size options which include 8.5×5.5 and 8.5×11 formats and the number of pages in the project for each graphic. For projects below a certain number of pages, the system defaults to providing saddle stitching as the only option, but on projects with a higher page count, it offers other available bindery options depending on what is appropriate for the thickness of the project. These options are graphically displayed and allow the print buyer to select the preferred option.

Presentation Folders: In the presentation folder category, there are two graphics of presentation folders. One graphic represents the front and back of a presentation folder. The other graphic represents the inside of the folder and includes representations of the pockets and die cuts for business cards on the pockets. The graphic of the front and back of the folder includes options for the standard variable items and in addition includes options for the size of the folder. The graphic representing the inside of the folder includes pull down options for the height of the pockets of the folder, position of the slits for business cards on either one of the pockets, printing on the inside pockets, number of inside pockets, and printing on the inside of the folder. The print buyer must complete these variable options and the system delivers an immediate quote.

Black and White Digital Printing and Photocopying: In the black and white digital printing and photocopying category, the buyer selects first selects one of two graphics including an 8.5×11 booklet and a 5.5×8.5 booklet. Then the buyer selects the number of pages which includes a selection to choose single or double sided copies, type of production-photocopying or digital printing, binding options, paper selections, turnaround time, quantity, and cover options. The type of production selection includes an explanation of the differences between the two methods. The binding options includes a selection of various binding options including saddle stitched, stapled upper left, spiral, and tape binding options that are offered depending on the thickness of the document. Paper selections include several standard options. The cover option includes an option to select a different color cover stock or clear acetate for both the front and back cover.

In addition, all products have an option for the user to print the specifications of a design, aiding in the design of the piece and eliminating the need for clarification of the specifications between the print provider, print buyer, and designer. These specifications include the size, areas for bleeds, and bindery specifications including position of any folds or scores. For all graphics that represent products that may be mailed via the U.S. Postal Service, there are additional design templates that can be printed which show special postal regulations that must be followed in order for the project to comply with postal regulations. Furthermore, additional information about postal regulations and rates is available as a pull down menu, which tells the print buyer the categories and the postage range for that item.

When the print buyer has selected the desired variables, the system uses the appropriate algorithm as outlined below to generate an immediate quote, as shown at 48 in FIG. 5. The print buyer can change any of these variables after receiving the quote and request another quote based on the new options, as indicated at 50 in FIGS. 4, 5 and 7. This allows the printing buyer to immediately see the impact of any specification changes on the price of the project.

Overview of the Procedure for Processing Quotes

Each print provider completes a price matrix on their home page 60 (FIG. 1A) for each item they want to supply for quantity ranges they are most competitive on. This price matrix will include the quantity and all variable information being offered on that item in addition to different production times.

Once the information is entered at 62, the data becomes part of the database 63 at 64 for that item.

A print buyer selects an item, turnaround time, and the variable information at 32.

The system searches the database 63 at 66 to find all vendors that have indicated being able to supply that item in the specified turnaround time and finds the ones closest to the delivery zip code. The system does this by analyzing the production time required for the project and then adds the appropriate transit time required to the delivery zip code. If a client specifies a one-week turnaround time for example, the system knows that the production time is three days and then adds appropriate ground shipping to the zip code. If however, the delivery address were in a location where standard shipping takes longer than three days, the system would tell the user that a one-week turnaround time is not available for that item.

Then the system searches for the lowest price for that quantity range and variable options among the vendors that have been identified.

Next it computes the weight of the order based on the quantity and paper weight and computes the freight at 68 by choosing the most competitive shipping method for each of the printing companies that meet the criteria in the search. Then the system displays the vendor with the most competitive printing and freight cost and assigns a reference number to the quote at 70.

Quoting Algorithms for Standard Products

Figure 9:
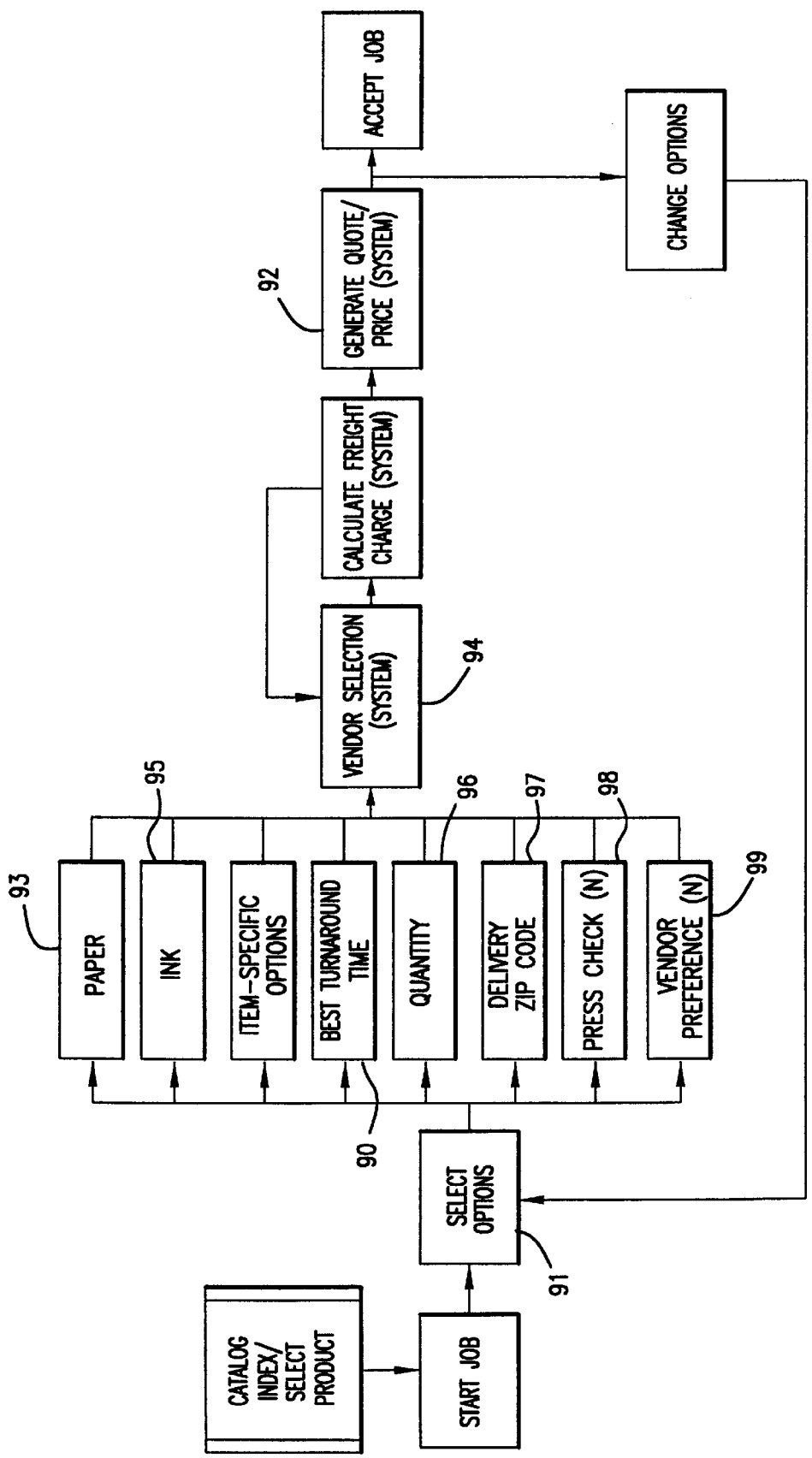
FIGS. 9–12 are representative flow charts of algorithms used to compute quotes for standard products in accordance with the invention.

The algorithms that will be used to compute the desired result depend on the variable selections made by the print buyer. Several of the common algorithms to compute the best solution are defined as follows. However, the result of each one is that the print buyer will be presented with the best possible solution for the project immediately with their specific requirements. The system uses algorithms such as:
Best Available Turnaround Time (FIG. 9)

In this algorithm, the system searches for the best turnaround time at 90 given the options selected at 91 by the print buyer for paper 93, ink 95, quantity 96, delivery zip code 97, press check 98 and vendor preference 99. The system generates a quote at 92 based on the prices of available print providers at 94 offering the best turnaround 90.

Figure 10:
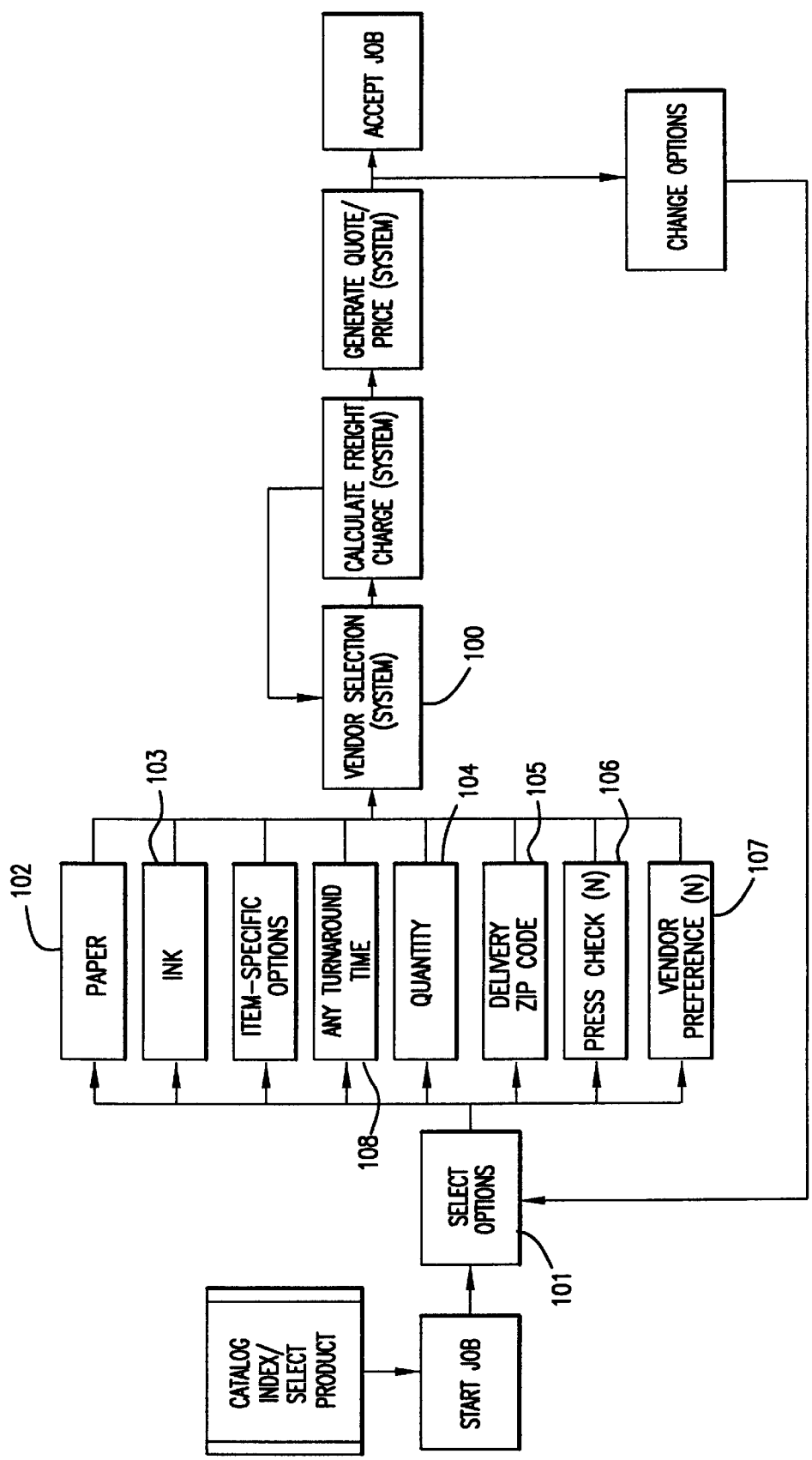

Best Price Available with any Turnaround Time (FIG. 10)

Figure 11:
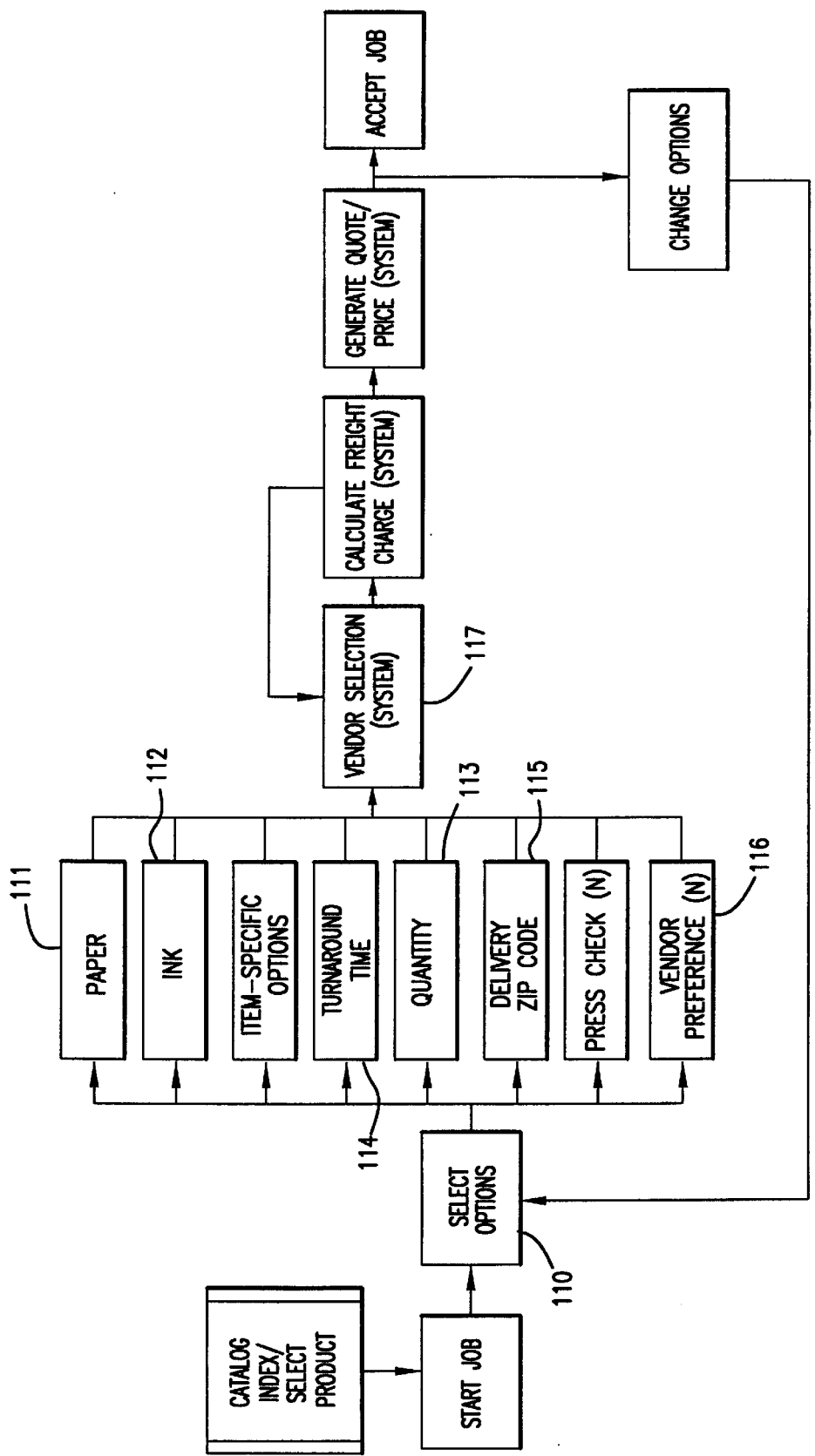

It is possible to search for the best value without specifying a turnaround time. In this algorithm, the system searches for the best price at 100 using the options selected at 101 for paper 102, ink 103, quantity 104, delivery zip code 105, press check 106 and vendor preference 107, but independent of turnaround time 108, to locate the print provider that offers the best price available.
Press Check Not Required-Best Price Based on Options Entered (FIG. 11)

Figure 12:
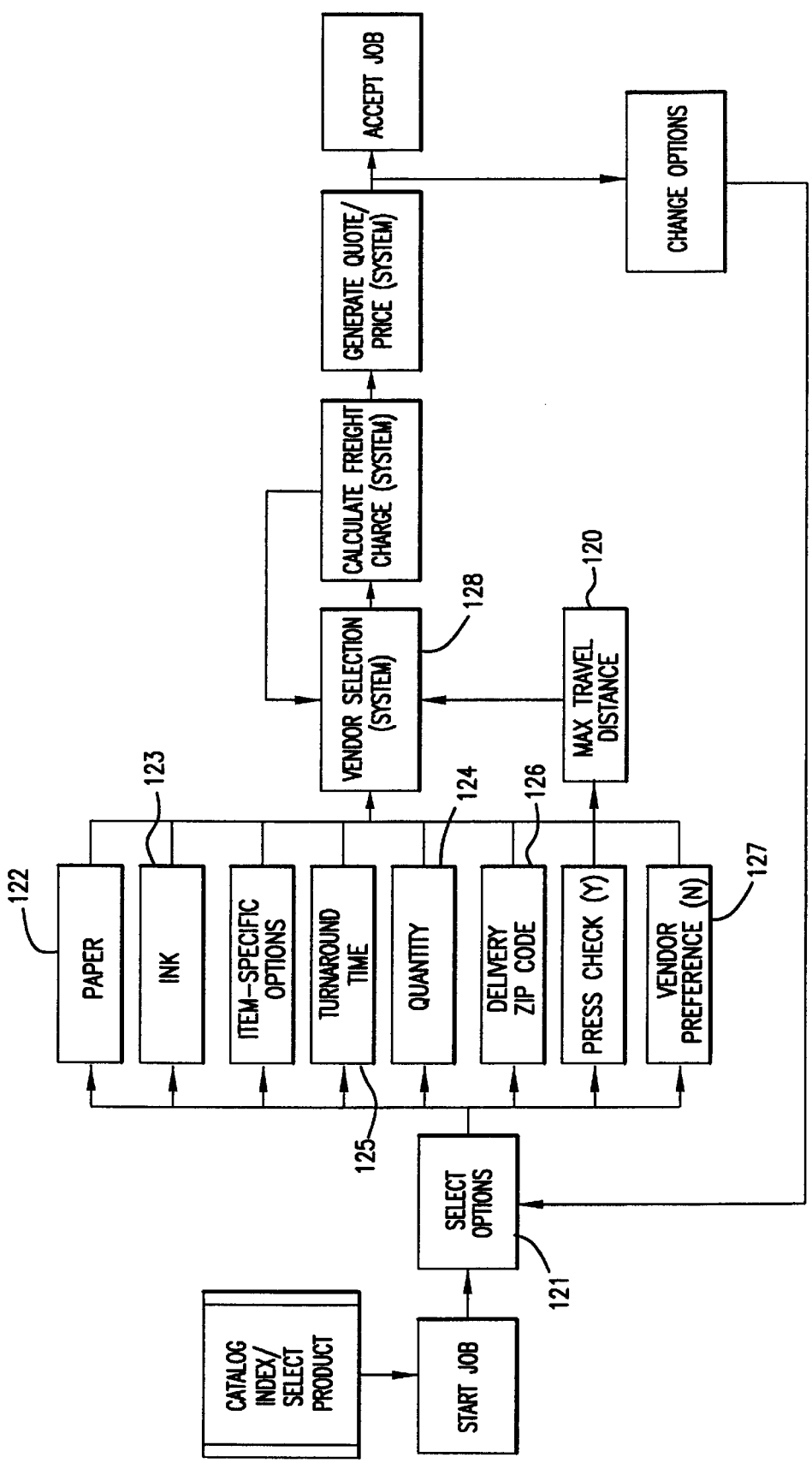

In this algorithm, the system uses the options selected at 110 for paper 111, ink 112, quantity 113, turnaround 114, delivery zip code 115, and vendor preference 116 to find the print provider at 117 that offers the best price given the criteria presented.
Press Check Required-Best Price Based on Options Entered (FIG. 12)

In this algorithm, the print buyer is prompted at 120 with an additional drop-down menu of distances they are willing to travel in order to perform the press check. The system then uses the print buyer's selected (at 121) travel distance, as well as the other options selected for paper 122, ink 123, quantity 124, turnaround 125, delivery zip code 126, and vendor preference 127 as variables to find the print provider at 128 that offers the best price given the criteria presented. Note that the print provider list is more limited in this algorithm.

Cost Savings in the Process

The Automated Internet Quoting and Procurement System reduces costs in the process of the printing industry in the following areas:

The print buyer saves time buying printing since immediate quotes are provided very efficiently. The system allows companies with multiple locations to more easily control printing expenses by requiring satellite offices to purchase using the system.

Sales costs in the transaction are drastically reduced because quoting and ordering is totally automated.

The system effectively aggregates volume. By aggregating the demand for these products and allowing the print provider's plants to run at higher efficiencies, the cost of the products will be lower. For example, if a printing provider has a 26" five color press, the provider may be most profitable producing full color 6×9 postcards with an aqueous coating from quantities of 50,000–100,000 for example. Any orders smaller or larger than these quantities do not optimize this particular press. Smaller or larger orders will have to have a lower billable hourly rate in order to be competitive resulting in reduced profit margins for these types of project. In theory, the printing provider would only sell jobs that meet these exact parameters, but the reality is that is not possible for any printing provider. With this system and process, the printing provider receives the optimal mix of products, thus optimizing production capabilities, which results in lower costs without any sacrifice in margins.

Figure 13:
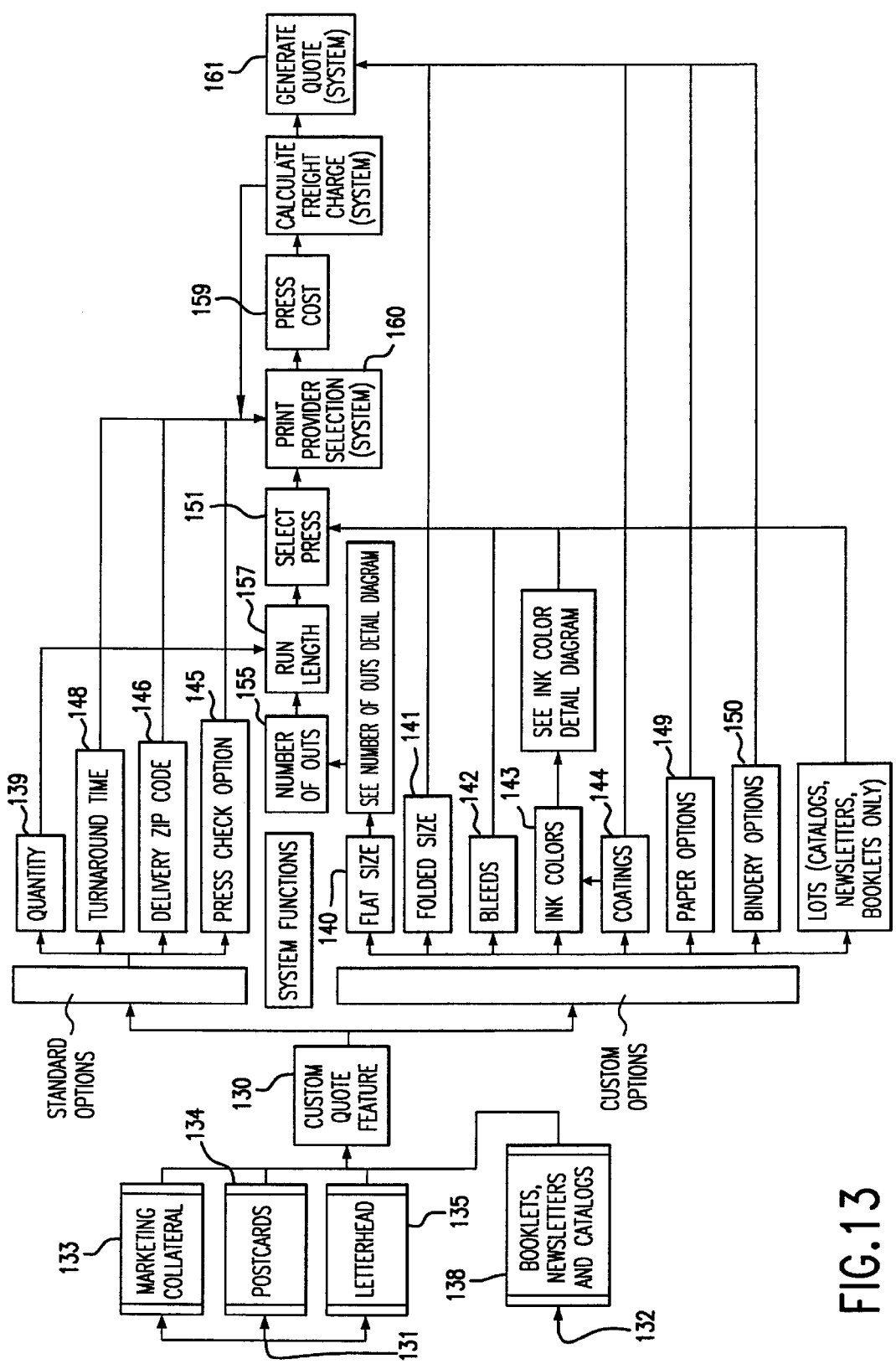
FIG. 13 is a general block and flow diagram of the custom quotes feature in accordance with the invention.

Custom Quote Products (FIG. 13)

If the Print buyer is looking for a product within a particular product category but cannot locate the specific product that matches the specifications for which they need a quote, the buyer can select the custom product graphic at 130 in the product category. The custom product graphic directs the Print Buyer to a series of graphic interfaces. The custom product interfaces allow the buyer to obtain an immediate quote on products with more specific options not found in that section by asking the buyer a series of questions.

The two custom products quoting functions 131 and 132 are for Marketing Collateral 133, Postcards 134, and Letterheads 135 and for Booklets, Newsletters, and Catalogs 138. These two categories of products allow the Print Buyer to obtain an immediate quote on virtually any type of product. The process for each of the product categories is as follows:

Marketing Collateral, Postcards and Letterheads: In this custom quotes interface 131, the Print Buyer will be asked the following questions using graphical interfaces to help explain each one:

Quantity 139: ___

Flat Size 140: ___$_{Length}$ ___ Width

Folded Size 141: ___ $_{Length}$ ___ Width

Bleeds 142: Yes or No

Ink Colors 143: Pull down menus for all available options or the print buyer can simply enter number of each side (graphics display a one color, two color, three color, and four color process, four color plus 1PMS, four color plus 2PMS)

Coatings 144: Pull down menus for available coatings applied on press or coatings available that are not press applied Press check option 145: Yes or No Delivery zip code 146: ___

Turnaround time option 148: Pull-down menus of available turnaround times

Paper Selection 149: The print buyer may select paper in one of three ways:
1) The system recommends a paper selection based on a pre-chosen profile.
2) The print buyer selects from pull down menus.
3) The print buyer accesses the paper prompt system which asks the print buyer a series of questions and then suggests and specifies an appropriate paper stock.

Bindery Options 150: The system allows for a number of different binding options including folding (various folding styles are shown with graphics) and perforating. The system will automatically provide for scoring of paper if paper is over a certain weight to ensure proper folds.

Figure 14:
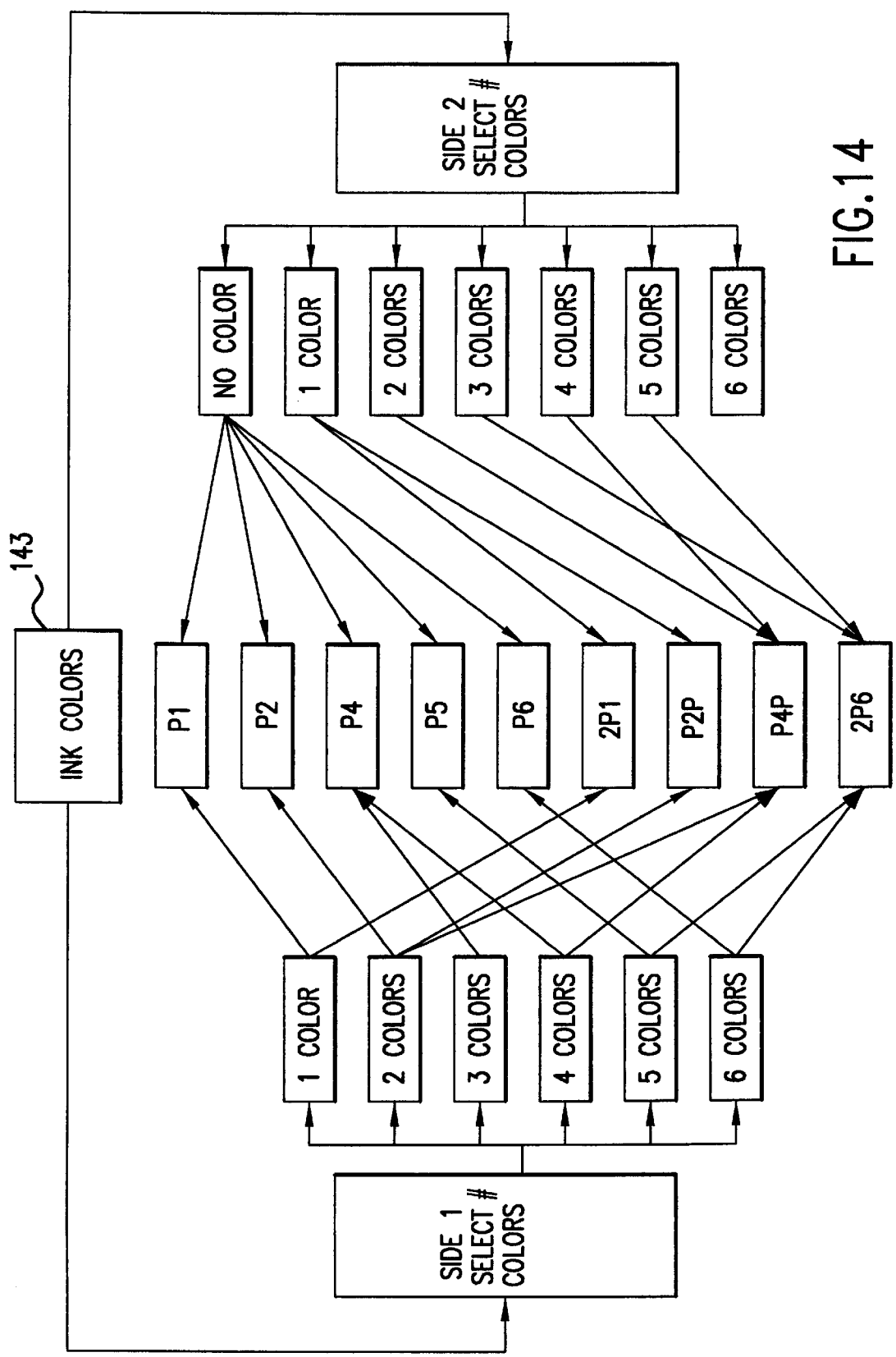
FIG. 14 is a general block and flow diagram for number of colors computations in the custom quotes feature of FIG. 13.

Once this information is obtained, the system begins to generate the quote using the following procedures:

The system assigns the type of press at 151 to be used to quote the project based on the number of colors and coatings that will be applied on press for each side. Further details are shown in FIG. 14. The following are common presses used in the system and shown in FIG. 14, together with a flow chart showing how the colors determine the press type:

$P_1$=one color press $P_2$=two color press $P_{2P}$=two color perfector press $P_4$=four color press $P_{4P}$=four color perfector press $P_5$=five color press $P_6$=six color press $P_8$=eight color press The following formulas, which depend on the number of colors, are used to determine the cost of press time. For example, $C_{1/0}$ means that the project is printed one color on one side only and is to be printed on a one color press. A project using $C_{1/1}$ means that the project is printed one color on each side of the sheet and is to be printed on either a one color press and needs to be run through the press twice or on a two color perfector.

$C_{1/0}=P_1$ $C_{1/1}=(P_1*2)$ or $P_{2P}$ $C_{2/0}=P_2$ $C_{2/1}=(P_2*2)$ $C_{2/2}=(P_2*2)$ or $P_{4P}$ $C_{3/0}=P_4$ $C_{3/1}=(P_4+P_1)$ or $(P_2*2+P1)$ $C_{4/0}=P_4$ $C_{4/1}=P_4+P_1$ $C_{4/2}=P_4+P_2$ or $P_4+P_4$ $C_{4/4}=P_4+P_4$ or $P_8$

Figure 15:
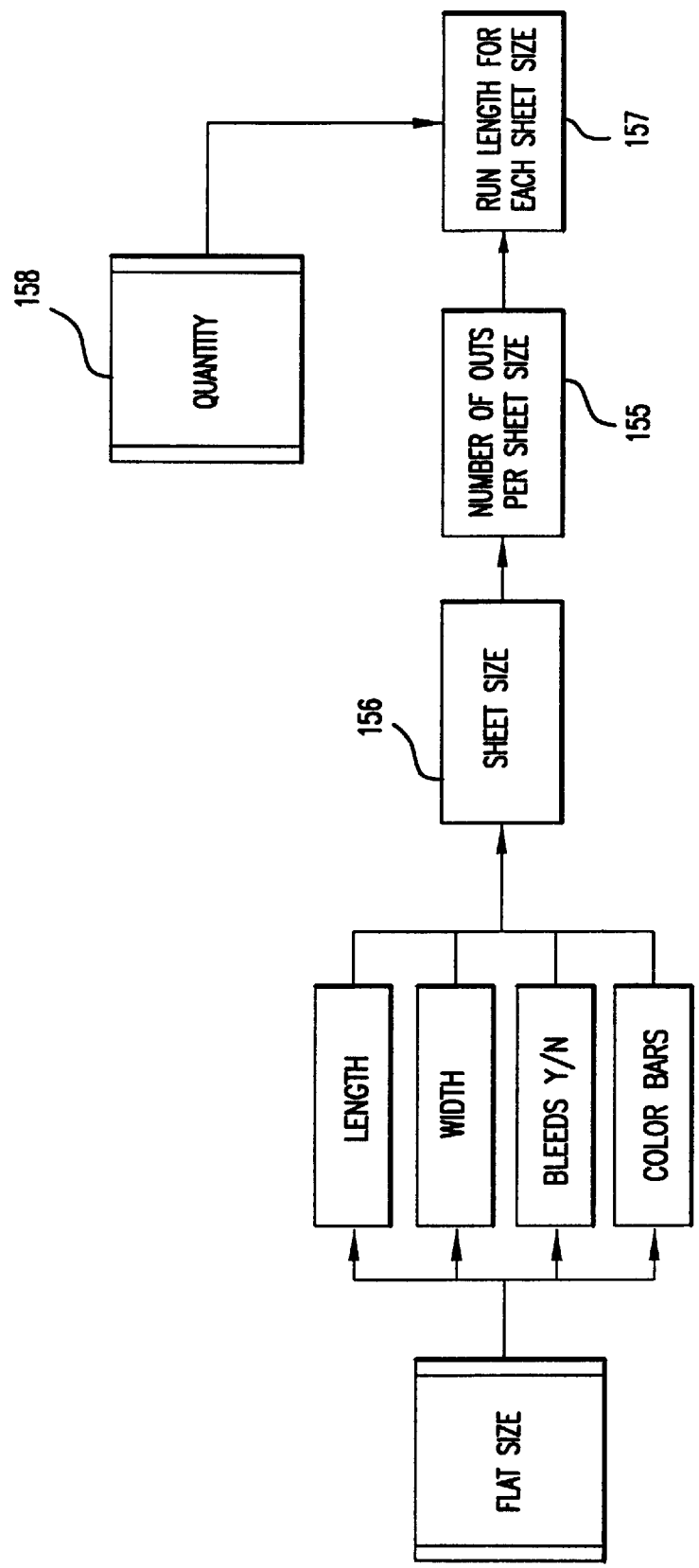
FIG. 15 is a general block and flow diagram for computations of the number of outs per sheet and the run length of the custom quotes feature of FIG. 13.

The system computes the number of outs at 155 for each various sheet size, as shown in FIG. 15. Minimum and maximum length and width dimensions apply for each type of project. The system automatically adds space for color bars to either the length or width depending upon the sheet size 156, adjusts the direction the project will run based on grain direction if necessary, and adjusts for bleeds. Using these new dimensions, the system divides both the length and width of the item into the length and width of the sheet size and rounds down to the nearest whole number. All computations for computing the number of outs for both the length and width are rounded down to nearest whole number and if less than zero are zero. Multiplying the whole numbers for both the length and width yields the number of outs. The number of outs are computed for common sheet sizes are as follows where:

O1=Outs on 11×17 sheet size

O2=Outs on 14×20 sheet size

O3=Outs on 20×26 sheet size

O4=Outs on 28×40 sheet size

O1=17/L+color bars+bleeds times 11/W+color bars+bleeds

O2=20/L+color bars+bleeds times 14/W+color bars+bleeds

O3=26/L+color bars+bleeds times 20/W+color bars+bleeds

O4=40/L+color bars+bleeds times 28/W+color bars+bleeds

The system computes the run length at 157 by dividing the desired quantity 158 by the number of outs 155 for each sheet. Common sheet sizes are as follows where:

R1=Run length on 11×17 press

R2=Run length on 14×20 press

R3=Run length on 20×26 press

R4=Run length on 28×40 press

R1=Quantity/O1

R2=Quantity/O2

R3=Quantity/O3

R4=Quantity/O4

The system then computes the cost of the press time at 159 (FIG. 13) from the additional information supplied during the custom product quote process by the Print Buyer for the press check option, delivery zip code, and turnaround time. Using these parameters, the system finds the best printing provider for the job at 160 from those available by using the hourly rate information supplied by the printing provider to compute the press time costs. The system adjusts the press speeds if necessary to account for paper differences. The press costs are computed based on the formula for the number of colors, CN/N, for each side of the project.

The basic formula to compute the press cost=CN/N hourly press rate times (RN/CN/N impressions per hour) plus CN/N make-ready time times CN/N hourly press rate.

The system computes the cost of the paper supplied by the print provider in costs per one thousand sheets for all press time costs by using the print buyer selections and by computing the size, run length, and the waste factor for that particular press.

Cost of Paper=[(RN plus makeready plus scrap)/1000] times the cost per thousand.

Then the system computes various bindery charges as follows. If there are no bindery requirements, the system displays the price and specifications.

Bindery Costs=BN set up costs plus (BN costs per thousand times quantity)

Finally the system adds all of the computed press times, paper costs, bindery costs, shipping costs and intermediary fees together and displays the price and specifications at 161.

Total Project Cost=(Press Time Cost+Cost of Paper+ Bindery Cost+Shipping Costs) times intermediary fee percentage.

After the print buyer receives the price and specifications, the print buyer may either proceed to order the product or if the price is more than the buyer's budget, the buyer has the option of entering the maximum price the buyer would like to pay for the project and allowing the system to generate a new quote by having the system change certain specifications, as shown in FIGS. 4, 5, and 7 and represented by the "change options" box 49 in FIGS. 1A, and 9–12. However, it should be noted that this component by no means constitutes an auction system of any type and there is no guarantee the system can generate any savings for that particular type of project. The system merely gives the buyer options the buyer may not be aware of. These include options such as changing the paper weight, quality or finish, slightly changing the dimensions of the project, omitting or changing a coating, or increasing the turnaround time, as indicated at 50 in FIGS. 4, 5, and 7. All of these options can have a major impact on the price of the project. For example, a print buyer may have entered dimensions for a brochure which allow the brochure to only be printed three up on the press that is best suited economically and in terms of production for that particular project. However, if the brochure was even a small percentage shorter in length or width, the brochure might be able to be printed four up resulting in a much lower cost. The weight, quality, or finish of paper can have the same type of price impact. If the system cannot produce a quote at or below the budgeted amount, the system will still output the other options that result in a lower price. However, the intent of this component is to allow the print buyer to have as much information as possible in order to make the most informed decision with a minimal effort for the buyer.

Figure 18:
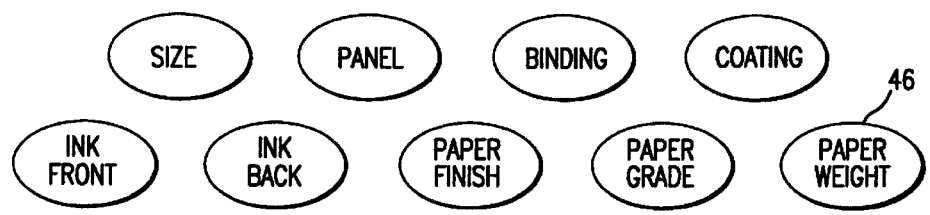
FIG. 18 is a Catalog Interface: Product Category: Obtain Quote for Standard or Custom Product.

Custom Quote Feature within Standard Products Quote (FIG. 18)

Alternatively, the custom quotes products feature can be contained within the standard products quotes feature by adding a custom size option 200. All of the other options 51 are the same as the ones offered in the standard product quotes options. When the Print Buyer enters a custom size into the application and selects the other options 51, the application processes the quote request in the same manner as if the information had been entered in the custom quotes feature described in the Custom Quote Products and FIG. 13.

Procurement Management

Print buyers have access to all catalog functions, such as those listed under "catalog" in FIG. 8, from either login or non-login mode, however, while in no-login mode, they will only have the option of receiving quotes, while in login mode, they will be able to place orders. Print buyers ready to purchase the quoted product are prompted for a credit card for payment. For large volume and creditworthy buyers, there is an option to set up a purchase order, which will also be handled through the Web interface.

Print buyer registration 162 (FIG. 1A)—the function through which print buyers establish an account. Registration consists of a series of interactive text fields where they input (type in) account, billing and shipping information. Once the account is established, print buyers will be able to log in.

Print buyer login 164—the function for those print buyers who have undergone the registration process and therefore have established an account, they input their log in and password in order to enter login mode, at which time they receive complete access to the system. Note that print buyers may have registered, but if they do not log in, they will not enter log in mode.

Job status—the function through which print buyers may check on the status of pending orders. Once print buyers have established an account and have placed orders using the system, they will be able to login at any time to check the status of their job. Job status includes basic information such as: "in production" or "on time", as well as critical information such as "missing font" or "approval required." This function is only available to print buyers in login mode.

Account status 34 (FIG. 1A)—the function through which print buyers may check on the billing status of their account. For print buyers who pay by credit card, the account status will most always be "paid in full." This function is only available to print buyers in login mode.

Account Management 36—the function through which print buyers add, edit or delete account information such as contacts, credit card information and shipping addresses, as well as maintain user accounts within a master corporate account.

The Print Provider Component

The print provider Component consists of a series of interfaces which allow the provider access to the system in order to enter information on job status and job history, production availability profile and pricing structure, and current contact information. Once published to the database, the data is instantly available to any print buyer accessing the application, from their personalized home page.

When a print provider logs in to the system with their supplied login name and password, the provider will see a page with content specific to them. This is their personal home page 60 (FIG. 1A). It is on this interface where they will find/have access to the following options:

View/update current job status. The print provider may search for a job by ID, keyword or other specified variable, or view all jobs in the queue and/or sort all jobs by date, print buyer name, or other specified variable View job history/archived job history. The print provider may search for a job by ID keyword or other specified variable. They select either "current" or "archived" depending on whether the status of the job is open or closed View/update production availability profile and pricing structure View/update contact information The detailed description of these functions follows:

Job Status

Each job is given an ID number automatically by the system once a print buyer requests a quote. The ID number, from that point on, is used to track job status. For any job, there will always be a status including on hold, in production, and completed. The print provider is required to update the status of a job each time that status changes. Any change in job status entered into the system will, upon approval, be viewable by the Print Buyer. For example, a Print Provider may require additional information about a job in order to begin. The Print Buyer is notified of this (on their personal home page and via inter-system electronic mail) as soon as the Print Provider provides the information and it is approved and submitted to the database.

Job status is updated by navigating from the Print Provider home page to the Update job status interface. The Update job status interface consists of a line-by-line listing of that Print Provider's active jobs with the following information/options. Note that a "link" involves navigating to a new page:

ID number

Current status with link to "Update job status"

Due date (due to be received at delivery address)

Brief description

Buyer contact information

Link to "View job history"

A Print Provider updates job status (FIG. 16) by navigating to the "Update job status" interface. Here they select a new status from a drop-down menu of options and click a button to submit the changes into the workflow. These options include:

File sent via FTP

File sent via overnight delivery

Order in production

On hold pending additional information from client

Shipped on [date]

The Link "View job history" points to the interface defined in the "Job history" section that follows.

Job History

For every job, there is a series of steps, which occur from when then quote is generated, to when the job is closed. Each of these steps is tracked within the system and viewable from the Job history interface for that particular job. This is a read-only interface (with the exception of certain administrators with the proper access privilege), which enables the Print Provider to look up important information such as dates the file was sent/received, delivery dates, press check status, etc. The interface lists, line by line, each status change and the date that that change was stored in the database.

Once a job is completed, it moves out of the current job queue into an archive. The history of that job will always be accessible to the Print Buyer with access to that account.

Production Availability Profile and Pricing Structure

Each Print Provider is required to maintain the listing of jobs being accepted. This information will include the type of jobs currently being accepted (i.e. postcards, marketing collateral, envelopes) as well as quantity, turnaround time and pricing for those jobs and available presses as well as run lengths, turnaround time, and hourly rates for those presses for the custom quotes feature. A Print Provider may add, delete or edit any job or press or any quantity, turnaround time or price associated with that job or press, in their profile at any time. The information entered is sent to the workflow for review by a content administrator, and once approved, is submitted to the system database. When a Print Provider makes changes to their production availability profile, the job or press in question (for that Print Provider only) is temporarily on hold until the administrator verifies the changes. During this time, quotes and orders with similar job specifications will be directed to other Print Providers in the network. Changes to the profile do not affect jobs currently in production.

A Print Provider's Production availability profile is updated by navigating from the Print Provider home page to the View/edit production availability profile interface. There are two types of availability profiles. One profile is for standard job categories such as postcards or marketing collateral and the other is for presses for custom product quotes. The standard job categories profile consists of four primary options, which are viewable from the profile interface:

Job category with options (i.e. Newsletters, 2 page, tri-fold, 9"×12", 1/1)

Quantity range

Turnaround time

Price

The presses for custom product quotes profile (FIG. 17) consists of the following primary options, which are viewable from the profile interface:

Press type 170

Impressions per hour 172

Hourly press rates 174

Make-ready time 176

Make-ready hourly rate 178

Press check cost 180

Turnaround time -days 182

Number of colors 184

Sheet size 186

Waste % 188

Make-ready waste # of sheets 190

The job category with options and presses for custom product quotes both have the same associated two functions: Delete or Add new. If the Print Provider selects "delete," the user will be presented with a confirm deletion interface. At that point the Print Provider may either confirm deletion or cancel the deletion request. Cancellation of the request returns the user to the previous interface. If the Print Provider selects "add," they enter a new interface, the "Add new job category with options" or the "Add new press with options" interface.

In the "Add new job category with options" interface, the Print Provider browses a master listing of job categories from a drop-down menu and selects the job to be added or enters it manually and chooses quantity ranges, turnaround times and prices. Because a Print Provider may offer a single Job category with multiple quantity ranges or turnaround times, there may be many line items with the same Job category.

In the "Add new press with options" interface, the Print Provider is prompted for the name of the press and all associated information including impressions per hour, hourly press rates, make-ready time, etc. for each press to be added.

The Print Provider can edit options such as quantity range and turnaround time for job categories or impressions per hour and hourly press rates for presses from the main profile interface using the following process:

Locate the line item (postcards, four color, impressions per hour, etc.) on the main profile interface Click the link titled "Edit" for the option desired Select or enter the updated information Click either the "Update profile" or the "Preview new profile"

After changing any of the options mentioned above, but before updating the profile, the Print Provider will have the opportunity to preview the new profile.

Current Contact Information

A Print Provider must provide current and accurate contact information. Contact information consist of the following:

Name

Title

Address

Phone number

Fax number

Email address

To update contact information, a Print Provider navigates from their home page to the "View/update contact information" interface. They manually enter text changes into the fields where the information has changed. The fields will automatically populate with the current information thus eliminating the need to re-enter any current and accurate data. After changing any of these fields, but before updating the information to the system, the Print Provider will have the opportunity to preview the new changes.

Contact information may be added, deleted or edited at any time through the interface.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A networked on line printing job procurement system, which comprises a networked data processing system including:

(A) a print buyer software component module for defining print buyer job specifications;

(B) a print provider software component module for specifying print provider job information; and (C) an automated printing job quoting software component linking said print buyer software component module and said print provider software component module to each other, said automated printing job quoting software component generating a first automated printing job quote based on said print buyer job specifications and said print provider job information, and thereafter suggesting a change to said print buyer job specifications to produce a second automated printing job quote lower than or equal to a maximum price set by a print buyer.

2. The networked on line printing job procurement system of claim 1 in which said automated printing job quoting software component additionally included program code for implementing printing procurement with said networked on line printing job procurement system.

3. The networked on line printing job procurement system of claim 1 in which the suggested change includes at least one of paper weight, paper quality, paper finish, a dimension change, omitting a paper coating, changing a paper coating or changing turnaround time.

4. The networked on line printing job procurement system of claim 1 in which said automated printing job quoting software component includes a database of print job information used by said automated printing job quoting software to provide automated print job quotes to said print buyer software component module.

5. The networked on line printing job procurement system of claim 4 in which said automated printing job quoting software includes program code for providing a plurality of menu screens organized by printing job type on a display of said networked data processing system, for receiving user responses to the plurality of menu screens, and for using the user responses to the plurality of menu screens to provide an automated print job quote on said display.

6. The networked on line printing job procurement system of claim 5 in which said automated printing job quoting software component additionally includes program code for implementing printing procurement with said networked on line printing job procurement system and said plurality of menu screens includes a user selection for beginning procurement of a printing job in response to the automated print job quote.

7. The networked on line printing job procurement system of claim 5 in which said plurality of menu screens includes at least one menu screen for specifying a custom print job.

8. An on line printing job procurement process, which comprises:

(A) inputting print provider job information into a networked data processing system to create a database of the print job information;

(B) inputting a print buyer job specification into the networked data processing system;

(C) generating a first automated printing job quote utilizing the database of the print provider job information in response to the print buyer job specification;

(D) outputting the first automated printing job quote to the print buyer; and (E) suggesting a change to said print buyer job specifications to produce a second automated printing job quote lower than or equal to a maximum price set by a print buyer.

9. The networked on line printing job procurement process of claim 8 in which the suggested change includes at least one of paper weight, paper quality, paper finish, a dimension change, omitting a paper coating, changing a paper coating or changing turnaround time.

10. The on line printing job procurement process of claim 8 in which the print buyer job specification is inputted into the networked data processing system using a plurality of menu screens organized by printing job.

11. The on line printing job procurement process of claim 10 in which the plurality of menu screens includes at least one menu screen for specifying a custom print job.

12. The on line printing job procurement process of claim 8 additionally comprising the step of:

(E) inputting a user input to the networked data processing system for beginning procurement of a printing job in response to the automated print job quote.

13. The on line printing job procurement process of claim 12 additionally comprising the step of:

(F) administering procurement of the printing job through the networked data processing system.

14. The on line printing job procurement process of claim 8 in which the print buyer job specification is inputted into the networked data processing system using a plurality of menu screens organized by printing job, the process additionally comprising the step of:

(E) inputting a user input to the networked data processing system through one of the plurality of menu screens for beginning procurement of a printing job in response to the automated print job quote.

15. The on line printing job procurement process of claim 14 additionally comprising the step of:

(F) administering procurement of the printing job through the networked data processing system.

16. An article of manufacture comprising computer program code stored in a computer readable storage medium, which computer program code will, when executed in a networked computer system, implement an on line printing job procurement process in the networked data processing system, said computer program code comprising:

(A) a first code segment for inputting print provider job information into a networked data processing system to create a database of the print job information;

(B) a second code segment for inputting a print buyer job specification into the networked data processing system;

(C) a third code segment for generating a first automated printing job quote utilizing the database of the print provider job information in response to the print buyer job specification;

(D) a fourth code segment for outputting the first automated printing job quote to the print buyer; and (E) a fifth code segment for suggesting a change to said print buyer job specifications to produce a second automated printing job quote lower than or equal to a maximum price set by a print buyer.

17. The article of manufacture of claim 16 in which the suggested change includes at least one of paper weight, paper quality, paper finish, a dimension change, omitting a paper coating, changing a paper coating or changing turnaround time.

18. The article of manufacture of claim 16 in which the first code segment is configured to input the print buyer job specification into the networked data processing system using a plurality of menu screens organized by printing job.

19. The article of manufacture of claim 18 in which the plurality of menu screens includes at least one menu screen for specifying a custom print job.

20. The article of manufacture of claim 16 additionally comprising:

(E) a fifth code segment for inputting a user input to the networked data processing system for beginning procurement of a printing job in response to the automated print job quote.

21. The article of manufacture of claim 20 additionally comprising:

(F) a sixth code segment for administering procurement of the printing job through the networked data processing system.

22. The article of manufacture of claim 16 in which the second code segment is configured to input the print buyer job specification into the networked data processing system using a plurality of menu screens organized by printing job, computer program additionally comprising:

(E) a fifth code segment for inputting a user input to the networked data processing system through one of the plurality of menu screens for beginning procurement of a printing job in response to the automated print job quote.

23. The article of manufacture of claim 22 additionally comprising:

(F) a sixth code segment for administering procurement of the printing job through the networked data processing system.

* * * * *